United States Patent [19]

Henmi

[11] Patent Number: 5,687,013

[45] Date of Patent: Nov. 11, 1997

[54] OPTICAL COMMUNICATION SYSTEM HAVING LOOP-BACK FUNCTION FOR INFORMING CONGESTION STATE OF RECEIVING NODE

[75] Inventor: Naoya Henmi, Tokyo, Japan

[73] Assignee: NEC Corporation, Japan

[21] Appl. No.: 527,379

[22] Filed: Sep. 13, 1995

[30] Foreign Application Priority Data

Sep. 14, 1994 [JP] Japan .................... 6-220078

[51] Int. Cl.[6] ........................ H04J 14/00; H04B 10/00
[52] U.S. Cl. .................... 359/117; 359/121; 359/166; 370/249; 370/237
[58] Field of Search ........................ 359/117, 118, 359/119, 120, 121, 123, 125, 128, 136, 137, 139, 166; 370/229, 235, 236, 237, 249, 252, 253

[56] References Cited

U.S. PATENT DOCUMENTS

| | | | |
|---|---|---|---|
| 4,731,784 | 3/1988 | Keller et al. | 359/119 |
| 4,809,361 | 2/1989 | Okasa et al. | 359/166 |
| 5,253,248 | 10/1993 | Dravida et al. | 370/237 |
| 5,296,957 | 3/1994 | Takahashi et al. | 359/166 |
| 5,510,923 | 4/1996 | Philippe et al. | 359/118 |
| 5,521,732 | 5/1996 | Nishio | 359/120 |

OTHER PUBLICATIONS

Arthurs et al, "A Broadband Optoelectronic Packet Switching System", IEEE Transactions on Communications No. 6 Jun./89 pp. 645–647.

P.A. Humblet, et al., "An Efficient Communication Protocol for High-Speed Packet-Switched Multichannel Networks", IEEE Journal on Selected Areas in Communications, vol. 11, No. 4, May 1993, pp. 568–578.

*Primary Examiner*—Wellington Chin
*Assistant Examiner*—Rafael Bacares
*Attorney, Agent, or Firm*—Ostrolenk, Faber, Gerb & Soffen, LLP

[57] ABSTRACT

An optical communication scheme is carried out by using a network having a plurality of nodes, a first network medium connected to a first group of the nodes, and a second network medium for transmitting control signals and connected to a second group of nodes. When initiating data transmission, any of the nodes transmits a transmission signal to the first network medium, and a receiving node that has received the signal loops-back the same signal to the second network medium thereby communicating information as to a state of congestion at the receiving node. A network for large volume data transmission can be realized by simple hardware and the state of congestion can be controlled using a simple method.

9 Claims, 6 Drawing Sheets

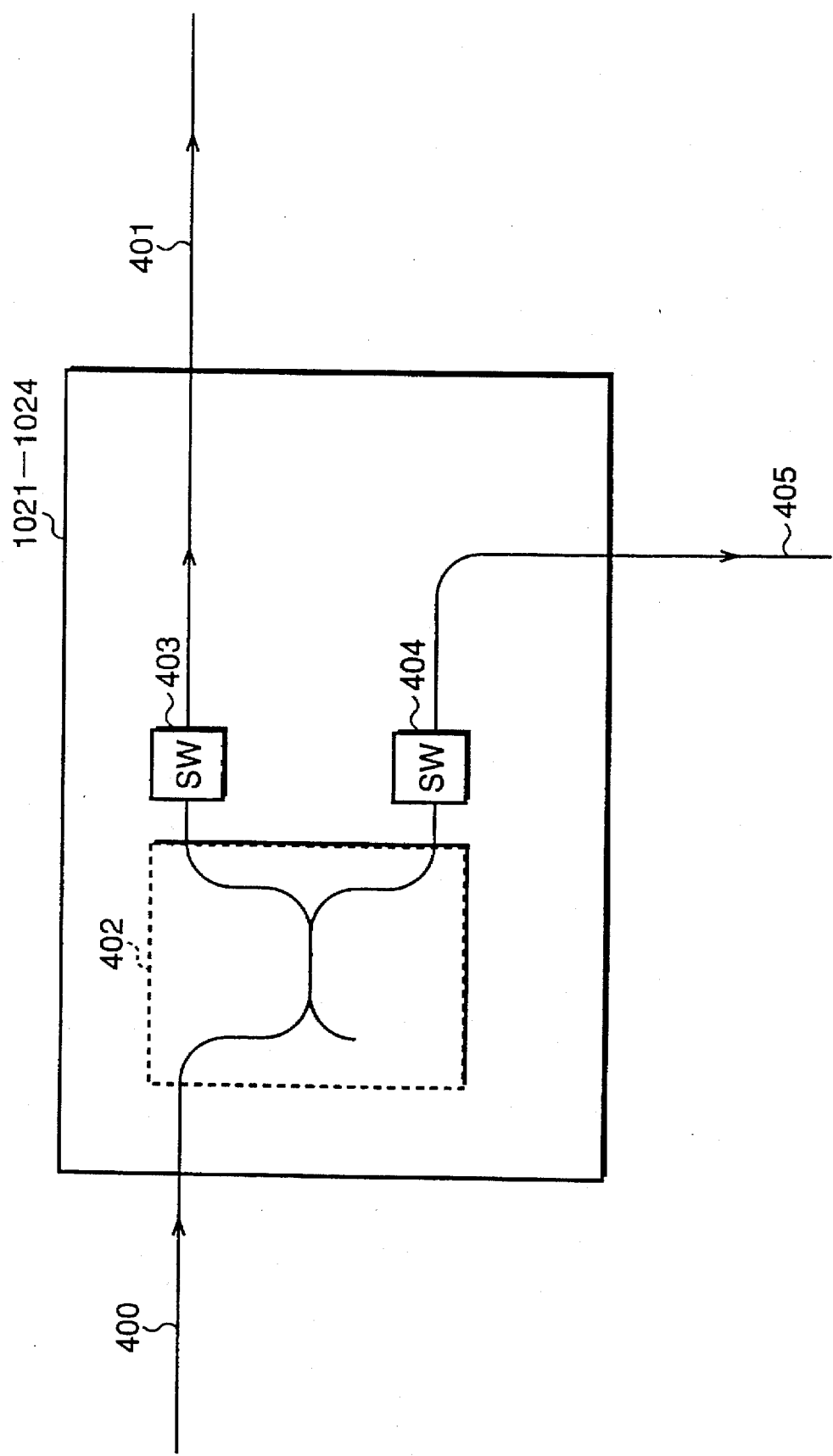

ial communication) network technology for communication among a plurality of nodes is typically represented by conventional telephone network technology, which utilizes a system wherein a plurality of nodes and line exchange switches are interconnected and in which the line exchange switches monitor the state of congestion of the receiving side of the communication and this information on the state of congestion is transmitted to the transmitting side of the communication as a part of the data communication media.

OPTICAL COMMUNICATION SYSTEM HAVING LOOP-BACK FUNCTION FOR INFORMING CONGESTION STATE OF RECEIVING NODE

BACKGROUND OF THE INVENTION (1) Field of the Invention

The present invention relates to an optical communication system, and more particularly to an optical communication method and an optical communication network device for communication among a plurality of nodes such as computer-to-computer or nodes within a computer.

(2) Description of the Related Art

An electro-communication (or electrical communication) network technology for communication among a plurality of nodes is typically represented by conventional telephone network technology, which utilizes a system wherein a plurality of nodes and line exchange switches are interconnected and in which the line exchange switches monitor the state of congestion of the receiving side of the communication and this information on the state of congestion is transmitted to the transmitting side of the communication as a part of the data communication media.

In a network within a computer having a plurality of processors as nodes, the network is constituted by, as is the case in networks within a super computer, a coaxial cable line which connects each processor with a cross bar switch which controls communication among the processors. In such a network, when a processor transmits data to another processor, the data is first sent to the cross bar switch, and the cross bar switch feeds back to the transmitting side the state of congestion of a destination processor. When there is a congestion state, the transmission output is stopped and the outputted signal is stored in a buffer within the cross bar switch. Further, when the congestion state of the destination processor no longer exists, then this is detected and the data stored in the buffer is transmitted to the destination, and the control is carried out for the communication to be made with the processor for which the communication is requested.

Each of the above two prior art network examples is a network in which the transmission volume is comparatively small, normally smaller than Gb/s. Thus, the network technology used is based on a conventional electrical network. However, recently, in view of the advancement in high speed operation of processors or the expansion in demands for an increased communication volume, extensive research is being made on optical networks utilizing optical communication techniques.

The optical network technology, as typically represented by a large volume optical communication technology, can be used especially advantageously when applied as a technology for transmitting a large volume of data at once through one optical fiber. However, with the currently available technology, it is impossible to carry out the optical logical signal processing technology by the congestion control as carried out in electrical communication. Thus, research is underway to solve this problem, and there is a proposal wherein, in media-access technology that has been employed in electrical communication, the same control channel is shared by nodes and, by using the control signal therefrom, the overall network control is carried out. This proposal is disclosed by P. A. Humbler, R. Ramaswami, and K. N. Sivarajan under the title "An Efficient Communication Protocol for High-Speed Packet-Switched Multichannel Networks", in IEEE Journal on Selected Areas in Communications, Vol. 11, No. 4, pp. 568–578, May 1993.

With the use of the conventional electrical communication technology, data transmission is becoming more difficult because of the problems presented by an increase in the data transmission volume and a lack of sufficient bands for transmission lines themselves. A further problem is that, since the control signal is extracted from the high speed data series, and the channel is controlled based on such a control signal, it is necessary to carry out a parallel process such as one in which the data is once time-divided and the resulting divided data are respectively subjected to switching processes. This results in requiring a large scale network.

On the other hand, with the use of the optical network technology utilizing an optical communication technique, it is possible to readily increase the volume of transmitting data as explained above. However, since the method for controlling the optical network is based on the media access method that has been in use in the conventional electrical communication network process, it has been a problem that efficient network control is difficult to be carried out. If the architecture of the control system is made so as to be able to carry out efficient data transmission, then there are problems such that the synchronization of the overall network becomes necessary and that, since a new optical network becomes necessary for the control system, the cost of the overall system increases and resources such as optical devices cannot be effectively utilized. Also, in the switching optical devices, it becomes difficult to obtain a response larger than Gb/s because of the switching time, it becomes difficult to scale down the size of the device, and it becomes difficult to make integrated mounting in the fabrication of the device.

SUMMARY OF THE INVENTION

An object of the invention is, therefore, to overcome the problems existing in the prior art and to provide a communication method and optical communication network device with which it is possible to realize, by simple hardware, a communication network capable of making large volume data transmission, and by which it is possible to control congestion by a simple control method.

According to a first aspect of the invention, there is provided a method for communication using a network having a plurality of nodes, a first network medium connected to a first group of the plurality of nodes, and a second network medium for transmitting control signals and connected to a second group of the plurality of nodes, the method comprising the steps of:

transmitting a transmission signal from any of the nodes to the first network medium when initiating data transmission, and looping-back to the second network medium the transmission signal from a receiving node that has received the transmission signal such that information on a state of congestion at the receiving node is communicated.

The method of communication according to the first aspect of the invention is one in which, in a communication network having a plurality of nodes, the signal transmitted from the node is looped-back as it is through a control signal transmission medium. According to this method, unlike in the congestion control conventionally carried out, even when a large volume of data is transmitted, for example, in Gb/s bands, the device for the congestion control loops-back the received signal as it is. Thus, the feature of the network device is in dispensing with a large scale circuit required for complex processing such as the time division of the received data as employed in a conventional control system. For this reason, the communication system provided by the invention is simpler and more economical than that of the prior art.

According to a second aspect of the invention, there is provided an optical communication network device having a plurality of nodes, a first optical fiber network connected to the nodes, and a second optical fiber network for transmitting control signals and connected to the plurality of nodes, each of the nodes comprising:

- a plurality of optical transmitters, a plurality of optical data receivers and a plurality of receiving side control signal receivers all of which are coupled to the first optical fiber network;
- a plurality of switching means each of which recognizes an address data addressed to a receiving node from a signal received at the receiving side control signal receivers, and performs switching between looping-back of the signal received by the first optical fiber network as it is to the second optical fiber network and introducing of the signal received into the optical data receivers; and
- a plurality of transmitting side control receivers which are coupled to the second optical fiber network.

The optical communication network device according to the second aspect of the invention is one in which each of the nodes has optical transmitters, optical receivers, receiving side control signal receivers, and transmitting side control signal receivers and in which, depending on a state of congestion at the receiving side, a signal transmitted from the optical transmitter is looped-back to the transmitting side through the control signal transmitting optical fiber network. In order to be able to transmit a large volume of data by making full use of the advantages of optical communication, it is necessary that the control of the optical communication network be simple and fast. In the prior art, a separate control channel is provided within the optical fiber network, and this channel is shared by a plurality of nodes for the transmission and reception of the control signal. Thus, each of the nodes requires a control signal optical transmitter and receiver in addition to that for data communication. However, according to the invention, such controlling is realized by a simple method wherein the signal transmitted from the transmitting side is looped-back as it is to the transmitting side through the loop-back means provided at the receiving side. Therefore, the network device according to the invention does not require such an optical transmitter for optical communication network control as required in the prior art optical communication network device, resulting in the reduction in cost of the overall communication network system and in the simplification of the device.

According to a third aspect of the invention, there is provided an optical communication network device which is structured the same as that of the second aspect of the invention, which is of a wavelength multiplex type and in which outputs of the optical transmitters provided respectively to the nodes have wavelengths different from one another.

In this network device, the optical signal outputted to the first network can be recognized from its optical signal wavelength as to which node has outputted the signal and, since the signal looped-back from the receiving side is also of the same transmission wavelength and the transmitting side control signal receiver selectively receives only the signal of the wavelength outputted by the transmitting node, it is possible to loop-back to the transmitting side the state of congestion at any of the nodes within the network. For example, by adding the receiving side address data to a header of the transmitting signal, the receiving side may, if available for receiving the signal, discontinue looping-back the signal and, in this way, it is possible for the receiving side to inform the transmitting side of the reception availability state of the receiving side. According to the invention, since the signal transmitted from the transmitting side is looped-back, the network device is functionally equivalent to one in which there exists, at the receiving side, several light sources having different wavelengths for optical communication network control, and in which the state of congestion is transmitted to the transmitting side through the optical fiber networks for communication network control. Thus, as compared with one that has such light sources for multi-wavelengths optical communication network control, the device according to the invention is advantageous in that the cost of the system is lower, the number of the devices required is smaller, and the system can be scaled down.

According to a fourth aspect of the invention, there is provided an optical communication network device which is structured the same as that according to the second aspect of the invention, in which the switching means provided respectively to the nodes comprise optical semiconductor gate switches.

In the device of the fourth aspect of the invention, at the receiving side of each node, the signal transmitted from the transmitting side is switched either to be looped-back or to be led to the receiver, and this is realized by the optical semiconductor gate switches. Advantages in this construction are that the signal received can be switched at such a high speed as on the order of nanoseconds and that a compact device can be realized by the integration of a large number of optical switches for switching operations. The device can be significantly scaled down as compared with, for example, a lithium niobate waveguide type optical switch, and the voltage required for the switching is also significantly reduced.

According to a fifth aspect of the invention, there is provided an optical communication network device which is structured the same as that according to the second aspect of the invention, in which the transmitting side control signal receivers provided respectively to the nodes comprise filter means for selectively receiving only the signal transmitted from the optical transmitter of a transmitting node.

In the device according to the fifth aspect of the invention, as explained with reference to the third aspect of the invention, the transmitting node transmits signals having different wavelengths corresponding respectively to different nodes, and these signals are looped-back as they are through the control signal transmitting network for informing on the state of congestion at the receiving side. Therefore, for the transmitting node to monitor the state of congestion of the receiving side, it is sufficient to provide only one control signal receiver that monitors the wavelength of the signal transmitted by the transmitting node. In this way, the architecture of the system is simpler and is of low cost as compared with the conventional device that receives a large number of control signals. Here, the recognition of different nodes depends on the wavelengths, but it is possible to attain the same by other means, such as by a sub-carrier system whereby a change is made in signal receiving bands for recognizing differing nodes.

According to a sixth aspect of the invention, there is provided an optical communication network device which is structured the same as that according to the fourth aspect of the invention, in which each of the optical semiconductor gate switches is arranged such that they function also as the receiving side control signal receiver.

In this device, the optical semiconductor gate switch is shared by the receiving side as a transmitting signal detecting monitor. Normally, the optical semiconductor gate switch employs a traveling-wave type semiconductor amplifier. Such an optical semiconductor gate switch functions as a gate switch such that it allows signals to pass through when the injected current is flowing, and intercepts signals when the injected current is not flowing. On the other hand, the inter-electrode voltages undergo changes depending on whether the current is present or not present so that it is possible to monitor the presence and non-presence by monitoring the inter-electrode voltages of the optical semiconductor gate switch. By using this theory, it is possible to cause the optical semiconductor gate switch to operate as the gate switch and, at the same time, as the control signal receiver for monitoring the presence and non-presence of the transmitted signal. This configuration results in reducing the number of the necessary optical devices in the entire system and also in reducing the cost of the system.

BRIEF DESCRIPTION OF THE DRAWINGS

The above and other objects, features and advantages of the present invention will be apparent from the following description of preferred embodiments of the invention explained with reference to the accompanying drawings, in which:

FIG. 4 is a diagram showing an arrangement of a switching means provided to each of the nodes, as a fourth embodiment according to the invention;

PREFERRED EMBODIMENTS OF THE INVENTION

Now, embodiments according to the invention are explained with reference to the drawings.

Figure 1:
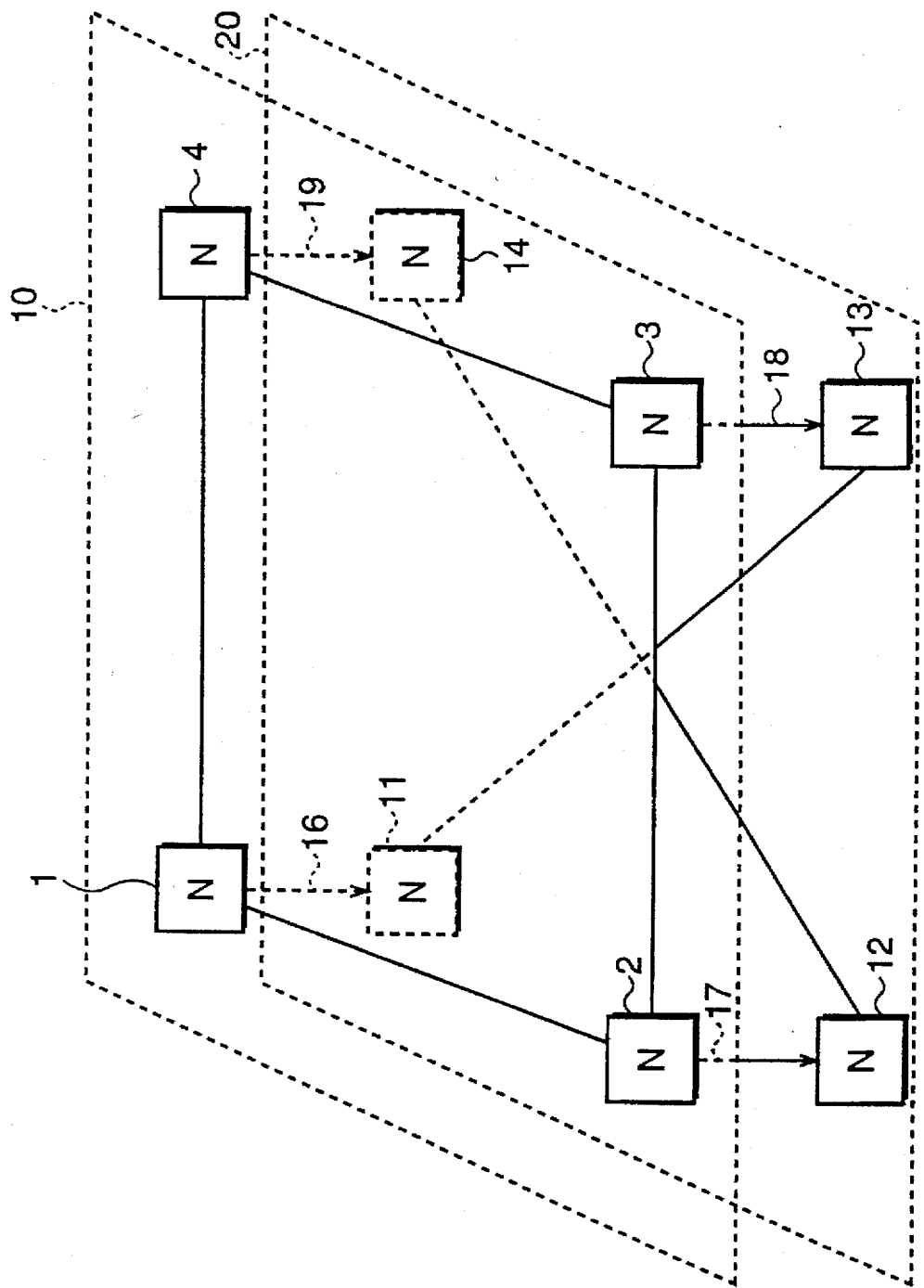
FIG. 1 is a structural diagram of an optical communication network of a first embodiment according to the invention.

A structure of a first embodiment is explained with reference to FIG. 1. As shown therein, a plurality of nodes (N) 1, 2, 3 and 4 are interconnected in a ring form by a network 10 that is a first network medium interconnecting them. The nodes 1, 2, 3 and 4 respectively have corresponding nodes 11, 12, 13 and 14 on a second network medium 20 for controlling signal transmission. The second network medium 20 is in a star configuration. Further, the nodes 1 and 11, the nodes 2 and 12, nodes 3 and 13, and nodes 4 and 14 are respectively interconnected by circuits 16, 17, 18 and 19 which transmit loop-back signals.

The operation of the above communication system is now explained. Each of the nodes is structured so as to transfer data at a rate of 150 Mb/s to another node within the network. The operation explained here relates to the case where the node 1 transfers data to the node 3. First, the node 1 sends a signal to a receiving side address using a sub-carrier signal which overlaps a frequency 1 kHz assigned in advance to each node in the network 10. Each node operates such that it detects the signal transmitted by the network 10, demodulates the sub-carrier signal and transmits the signal as it is to the next node. Where the sub-carrier signal transmitted to a receiving node is the signal addressed to the node itself, this node operates so as to loop-back to the transmitting side a congestion state of the receiving node. That is, the address signal sent to the network 10 from the node 1 is transmitted to the node 2 which recognizes that the signal is not intended therefor and transmits the signal as it is to the node 3. The node 3 recognizes that the signal transmitted thereto from the node 2 is intended to its address and transmits this signal as it is to the node 13 through the loop-back circuit 18. The node 13 loops-back through the network 20 a loop-back signal to the node 11 coupled to the transmitting side node 1. In this case, if the node 3 is in a congested state, the loop-back signal is sent out and, if the node is not in such a state, the control is made so as not to send back the loop-back signal. In this way, if the loop-back signal is not returned through the node 11 within a certain time period, the node 1 will judge that the receiving side node 3 is available for the reception of the signal, and can start the data transmission. As long as the node 3 keeps on returning the loop-back signal, the control for congestion is in effect so that the unavailability for the reception at the receiving side node 3 is looped-back to the node 1.

In the above communication system, when the receiving side informs the transmitting side of a state of congestion of the receiving side, the receiving side is not required to carry out any high speed signal processing, and the control of congestion can be effected only by means of simple switching of the loop-back signals.

In this embodiment of the invention, various modifications can be thought of. For example, the number of the nodes connected by the first and second networks is not limited to four as it can be larger or smaller. The structure of each of the first and second networks is not limited to that of a ring or a star type, and it may be of other. topologies including a mesh type. The bit rate to be transmitted is not limited to 150 Mb/s, and it may well be 100 Mb/s or 1 Gb/s, or larger or smaller. Also, the volume of data transmitted from respective nodes does not need to be the same and the transmission can be made at different data rates. The system for transmitting address signals to a receiving side address is not limited to a sub-carrier system, and the transmission may be by time multiplexed data or code multiplexed data such as CDMA (Code Division Multi-Access) in so far as the signal looped-back can be recognized as being the data transmitted from the transmitting node. Further, the means to transmit data concerning a state of congestion at the receiving side is not limited to one based on whether the loop-back signal is present, and the loop-back signal may be transmitted after being modulated, or any other means may serve the purpose as long as the transmitting side can be informed of the state of congestion of the receiving side.

Next, a second embodiment according to the invention is explained with reference to FIG. 2.

The optical communication network device of this embodiment is structured as explained hereinafter. A plurality of nodes are paired by optical transmitting sections 51, 52, 53 and 54 and optical receiving sections 151, 152, 153 and 154, respectively. These nodes are interconnected through a first optical fiber network 101 in a star configuration. Also, the respective nodes are interconnected through a second optical fiber network 201 of a star configuration for looping-back a control signal from the receiving side to the transmitting side. Further, the respective nodes are constituted by optical transmitters (TX) 61, 62, 63 and 64, optical data receivers (RX) 161, 162, 163 and 164, receiving side control signal receivers (RX) 181, 182, 183 and 184, switching means (SW) 171, 172, 173 and 174, loop-back signal controllers (CTL) 191, 192, 193 and 194 for controlling the loop-back device by using control signals received at the receiving side control signal receivers, transmitting side control signal receivers (RX) 71, 72, 73 and 74 for receiving the loop-back signals through the second optical fiber network 201, and controllers (CTL) 81, 82, 83 and 84 for controlling the optical transmitters by using optical signals received at the transmitting side control signal receivers. According to one mode of this embodiment, the output wavelengths of the optical transmitters are set to wavelengths different from one another, as 1.53 μm, 1.54 μm, 1.55 μm, and 1.56 μm.

Figure 2:
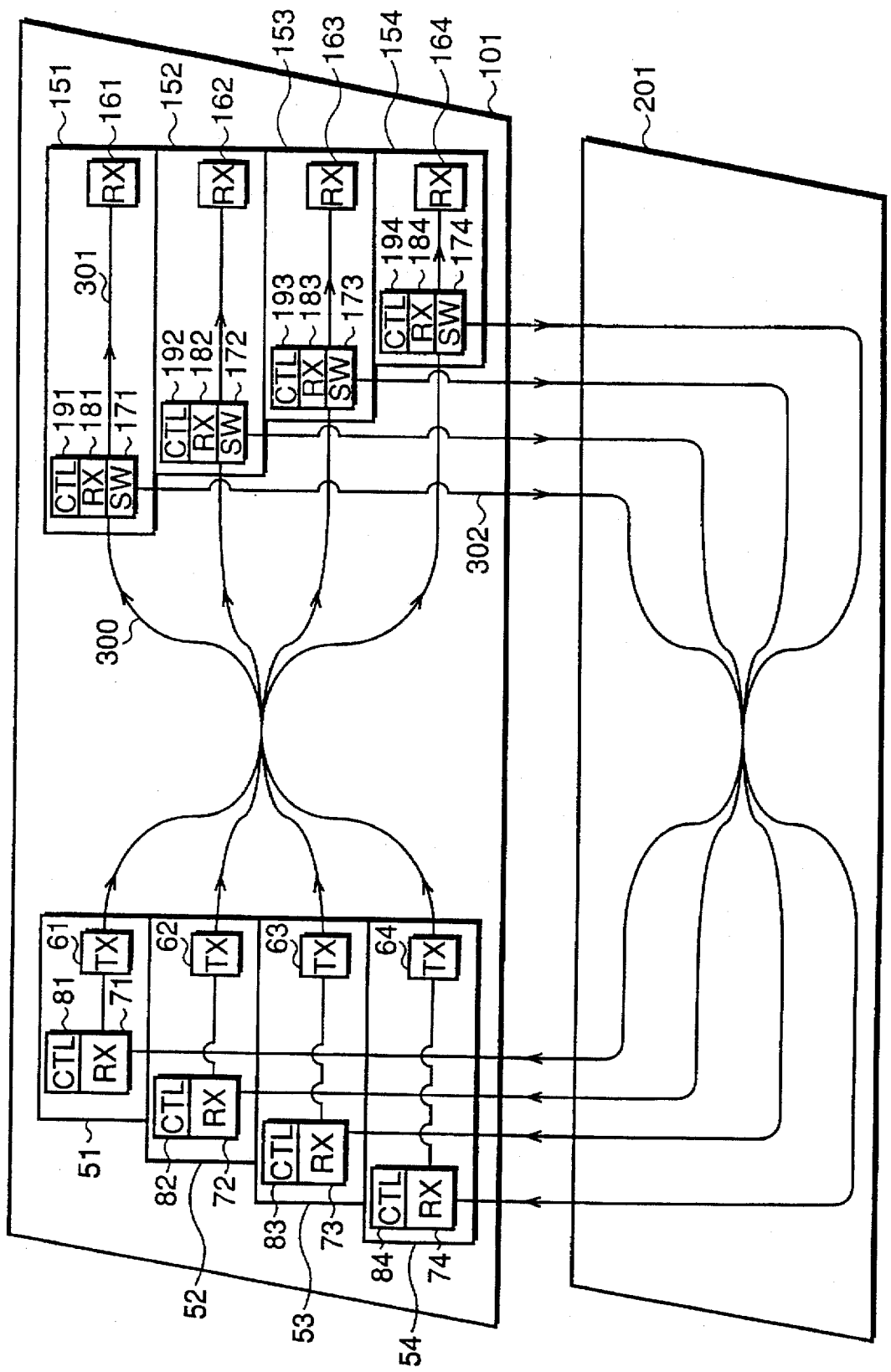
FIG. 2 is a structural diagram of an optical communication network of a second embodiment according to the invention.
Figure 3:
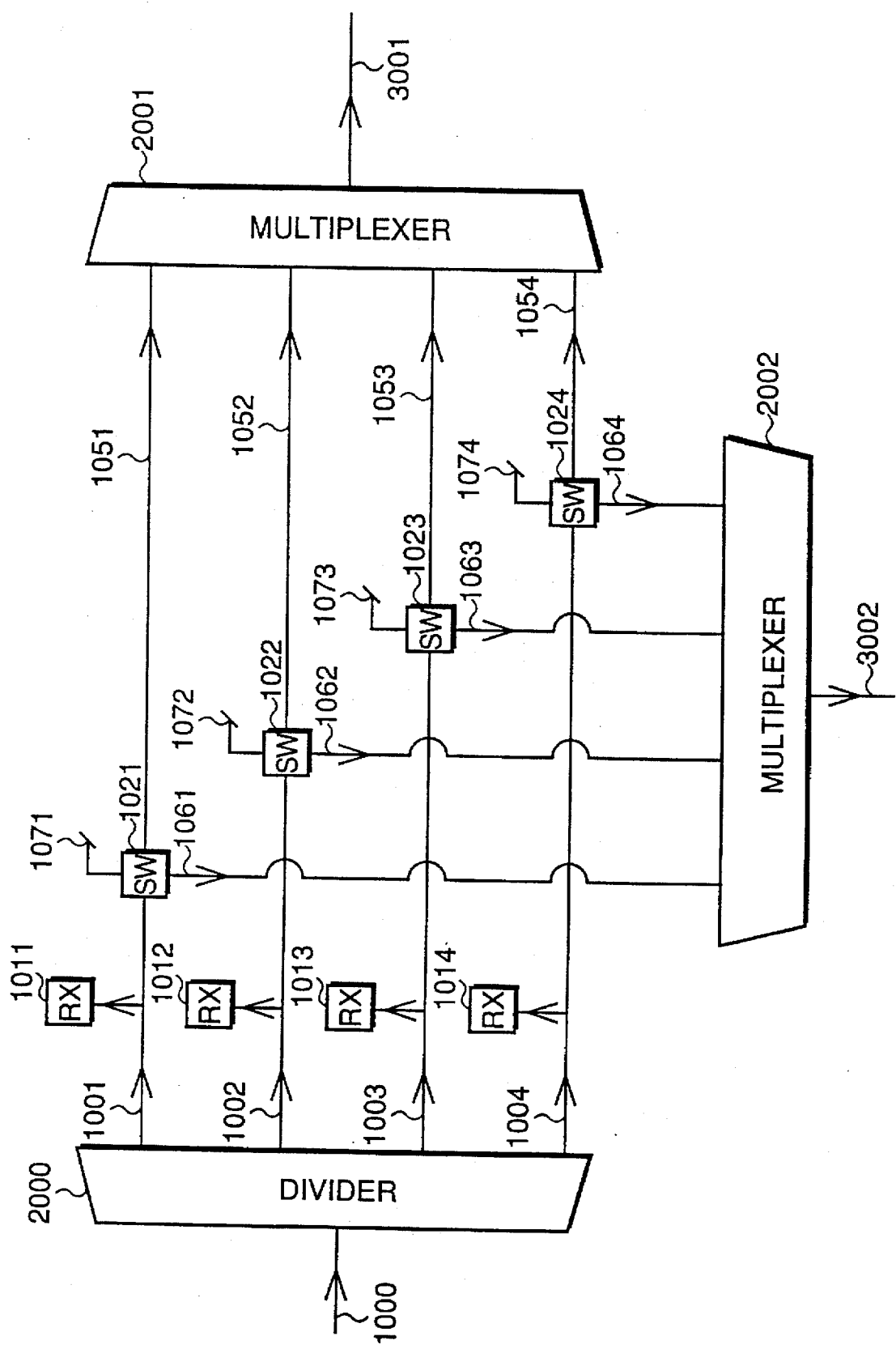
FIG. 3 is a diagram showing an arrangement of a loop-back device provided to each of the nodes, as a third embodiment according to the invention.

FIG. 3 shows structural details of the loop-back device provided to each of the nodes, as a third embodiment of the invention. The loop-back device divides the received signal 1000 by the wavelength divider 2000 such that the optical signals of 1.53 μm, 1.54 μm, 1.55 μm, and 1.56 μm correspond to 1001-1004, and introduces the divided signals to the receiving side control signal receivers (RX) 1011-1014 and to spatial switches (SW) 1021-1024. The spatial switches 1021-1024 are such that, by the signals from the receiving side control signal receivers 1011-1014, they can be set in three different modes, that is, the optical signal being connected to the lines 1051-1054 coupled to the optical receivers, being connected to the lines 1061-1064 coupled to the loop-back lines, and being in a non-connected state with the lines 1071-1074 being open ended. The signals in the lines 1051-1054 outputted from the spatial switches 1021-1024 are wavelength multiplexed by a wavelength multiplexer 2001 and then outputted to the line 3001 leading to the optical receiver, and the signals in the lines 1061-1064 are wavelength multiplexed by a wavelength multiplexer 2002 and then outputted to the loop-back line 3002. When the switching means of the first node in the structure shown in FIG. 2 is taken as an example, the input signal 300 therein corresponds to the signal 1000 in FIG. 3, the signal 301 to the optical receiver corresponds to the signal 3001 in FIG. 3, and the loop-back signal 302 corresponds to the signal 3002 in FIG. 3.

Now, the operation of the optical communication device structured as above and shown in FIGS. 2 and 3 is explained. The operation is explained on an example wherein the request has been received for the data to be transmitted from the first node to the fourth node. In this case, the first node transmits to the network 101 the address data of the fourth node at the wavelength of 1.53 μm by means of the optical transmitter 61. Through the network 101, the signal transmitted is inputted in the switching means 171-174 of each node and is simultaneously wavelength-divided, and the resulting signals are received by the control signal receivers 181-184. The control signal receivers 181-183, that is, in this example, the receiving side control signal receiver 1011, which are related to the wavelength of 1.53 μm, detects that there is a transmission request from the first node. However, they detect that the 1.53 μm signal does not include the address signal addressed to the first—third nodes, and so the switching means 171-173 are set to non-connected states. On the other hand, at the fourth node corresponding to the receiving node, the control signal receiver 184 detects, by the receiving side control signal receiver 1011, the node address that is addressed to the fourth node. At this time, if the optical receiver 164 of the fourth node is communicating with other nodes at different wavelengths, then the loop-back signal controller 194 connects the switching means 174 to the loop-back line, and loops-back through the network 201 the address data of 1.53 μm wavelength that has been transmitted to the receiving node. If, on the other hand, the optical receiver of the fourth node is not communicating with other nodes, the loop-back signal controller 194 connects the switching means 174 to the optical receiver 164, and controls the switching means 174 to switch for setting a reception stand-by state.

Now, it is assumed that, for example, after the above communication process has been completed and the first node and the fourth node has begun the communication at the data rate of 10 Gb/s, the second node has made a request to communicate with the fourth node. The second node sends out the address signal using the 1.54 μm wavelength by means of the transmitter 62. This signal is wavelength-divided at the receiving side of the fourth node and is then detected by the receiving side control signal receiver 184. Since the fourth node is in communication with the first node, the switching means 174 is connected to the loop-back line, and the 1.54 μm wavelength signal is looped-back to the second node through the network 201 whereby the congestion state of the fourth node is transmitted.

The arrangements explained above have made it possible to realize the optical communication network device which can easily transmit to the transmitting node the state of congestion at the receiving node.

In this embodiment of the invention, various modifications can be thought of. For example, the number of the nodes is not limited to four as it can be larger or smaller. The bit rate for transmission is not limited to 10 Gb/s, and it may well be 1 Gb/s or 20 Gb/s, or larger or smaller. Further, it is not required for the entire network to be synchronized, and different nodes may transmit data at different bit rates. Instead of assigning different wavelengths to different transmission nodes, it is possible to assign frequency numbers of sub-carriers thereto. Further, as to the topology of the network, it is not limited to that of a star type as other topologies such as those of ring or mesh type may be employed. It is also possible to arrange such that the first network in which the transmission and the reception are reversed is assumed to be the second network whereby, by utilizing one optical fiber network in both directions, two equivalent networks can come into existence. Also, the signal wavelengths assigned to the optical transmitter are not limited to 1.53, 1.54, 1.55 and 1.56 μm as the wavelength such as 0.8 μm or 1.3 μm may be used as long as the necessary wavelength source can be obtained thereby. Further, the wavelength interval to be set is not limited to 0.01 μm as it may be 1 nm or 0.1 μm, or larger or smaller. Also, it is possible to introduce optical amplifiers into the optical fiber networks for the compensation of losses.

Furthermore, if, instead of arranging the transmitting section and the receiving section in one node, the signal input side and the signal output side are made to correspond with each other, the resulting structure may be considered a switch which operates asynchronously. In this case, the structure can be caused to operate, for example, in an Asynchronous Transfer Mode (ATM) by providing a buffer which is explained later.

FIG. 4 is a structural diagram for explaining a fourth embodiment of the invention. A feature of the embodiment is that, in the loop-back system shown in FIG. 3, use is made of an optical semiconductor gate switch.

The structure of the fourth embodiment is explained with reference to FIG. 4 which shows an arrangement of a switching means provided to each of the nodes. The function of the switching means is equivalent to that of the spatial switch 1021 in FIG. 3. With this switching means, the input optical signal 400 is split into two signals by an optical splitter 402, and split signals are led to the optical semiconductor gate switches (SW) 403 and 404, respectively. The optical signal having passed through the optical semiconductor gate switch 403 becomes an optical receiver signal 401, and the optical signal having passed through the optical semiconductor gate switch 404 becomes a loop-back signal 405.

Now, the operation of the switching means is explained. This switching means is required to have a function to set an input signal into one of three different modes, namely, being connected to the receiver line, connected to the loop-back line, and connected to none. The optical semiconductor gate switch is a semiconductor amplifier and has characteristics such that the light is allowed to pass when the injection current of several ten mA is applied, and the light is blocked when the injection current is intercepted. Thus, for connecting the input signal 400 to the receiver side, the injection current is applied (ON) to the semiconductor gate switch 403, and the injection current is intercepted (OFF) to the semiconductor gate switch 404. For looping-back the signal, it is operated such that the semiconductor Gate switch 404 is caused to be ON, and the semiconductor Gate switch 403 is caused to be OFF. Further, when both the semiconductor Gate switches 403 and 404 are caused to be OFF, the non-connected mode is realized.

Where the optical semiconductor Gate switch described above is used, by applying a small current such as several ten mA, it is possible to cause the switching means to be operated, and by using a semiconductor element, it is possible to obtain a compact switching structure.

Figure 5B:
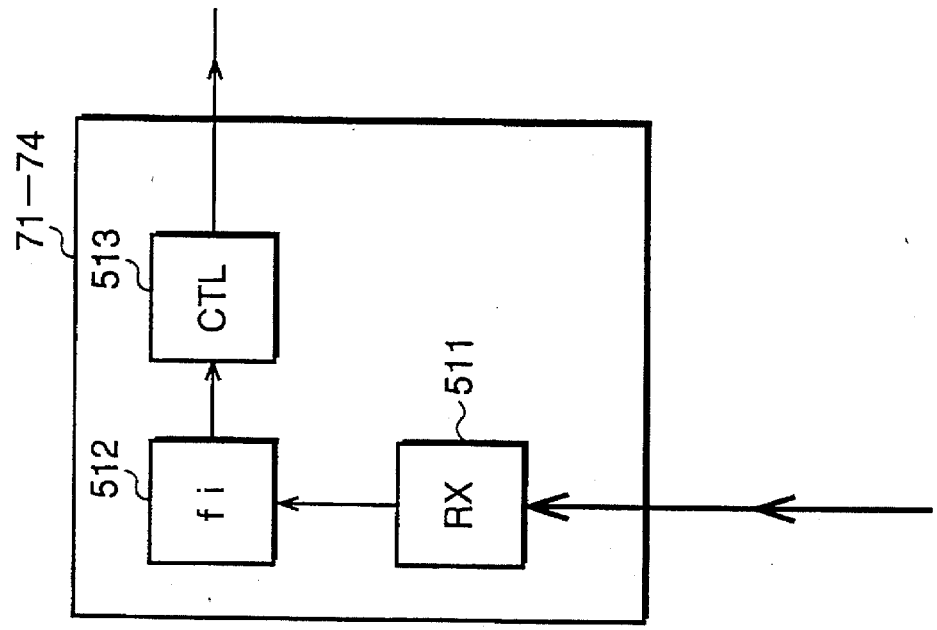
FIGS. 5A and 5B are diagrams showing arrangements of control signal receiver structures, as a fifth embodiment according to the invention, FIG. 5A showing a structure in which different wavelengths are assigned and FIG. 5B showing a structure in which different sub-carrier frequencies are provided.
Figure 5A:
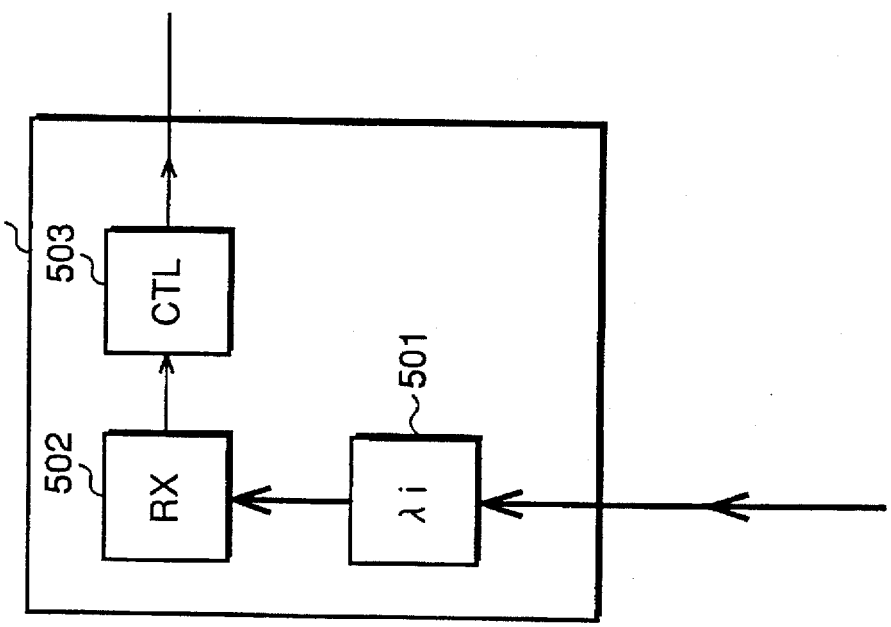

FIGS. 5A and 5B are structural diagrams for a fifth embodiment of the invention. The embodiment relates to a control signal receiver structure by which the signal looped-back is detected from the second optical fiber network. Illustrated herein are details of the transmitting side control signal receivers 71–74 shown in FIG. 2.

The receiver shown in FIG. 5A is one in which, when the different wavelengths are assigned to the transmitting side as in the case of the third embodiment, the address signals assigned to respective nodes are received as loop-back signals. Here, one example is shown of the structure of the transmitting side control signal receiver which corresponds to the node 1. The control signal receiver is configured such that the signal having passed through an optical band pass filter ($\lambda i$) 501 having a bandwidth of 2 nm with its center being 1.53 μm which corresponds to the wavelength of 1.53 μm of the signal transmitted from the node 1 is received by an optical receiver (RX) 502 and transmitted to a signal controller (CTL) 503. In this way, the looped-back signal of the signal transmitted from the node 1 is selectively received easily.

FIG. 5B is a structural diagram of a typical loop-back control signal receiver in which different sub-carrier frequencies are provided at the transmitting side. This is structured such that the loop-back signal is first optically received by an optical receiver (RX) 511, and then is filtered by an electrical filter (fi) 512 for passing sub-carrier frequencies of the signal transmitted from the node 1. The filtered signal is received by a signal controller (CTL) 513.

As explained above, by an arrangement so that the respective transmission signals are transmitted by using different wavelengths or different sub-carriers, it is possible to structure the control signal receiver such that the looped-back signals are easily selectively received.

In this embodiment of the invention, too, there can be various modifications that can be thought of. For example, the filter bandwidth for filtering wavelengths is not limited to 2 nm as it can be larger or smaller as long as the signals from other nodes can be distinguished. Also, the filter does not have to be the band pass filter as described. Further, the filter for selectively extracting a sub-carrier signal can be any electrical filter if capable of receiving signals selectively. There is also a possibility for a signal from a node to be distinguished from signals from other nodes by using codes such as CDMA.

Figure 6:
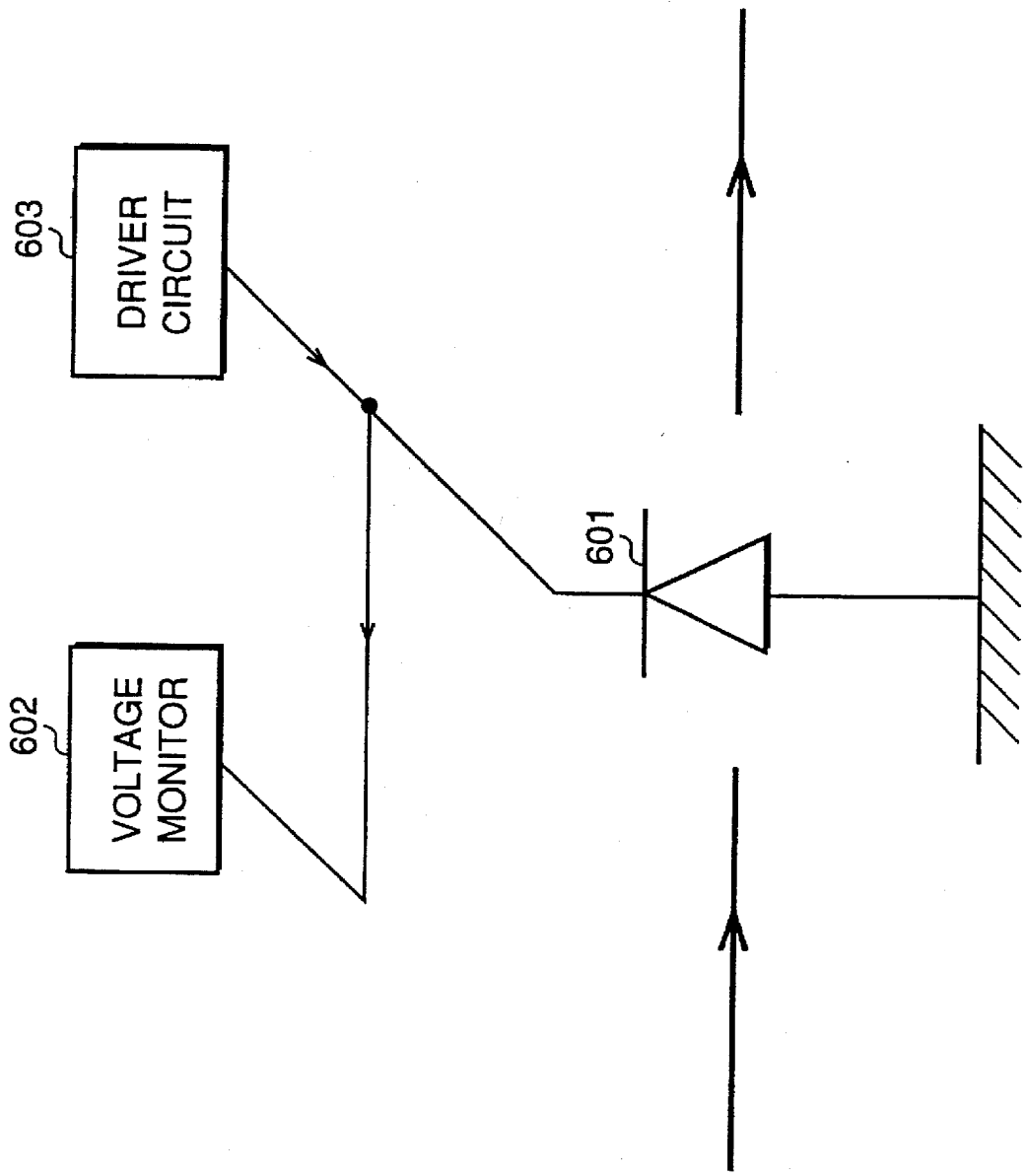
FIG. 6 is a diagram showing an arrangement of an optical semiconductor gate switch which is shared by a receiving side control receiver, as a sixth embodiment according to the invention.

FIG. 6 is a structural diagram for a sixth embodiment of the invention.

This embodiment is featured in an arrangement wherein the optical semiconductor gate switch shown in FIG. 4 is shared also as the receiving side control receiver. In this embodiment, the spatial switches 1021–1024 and the control signal receivers 1011–1014 as shown in FIG. 3 are indispensable at the receiving side. Thus, the idea here is to receive the control signal by using a terminal voltage of the optical semiconductor gate switch which exists in each of the spatial switches.

This embodiment makes use of a semiconductor optical amplifier 601. The terminal voltage of the optical amplifier 601 is detected by a voltage monitor 602 and, at the same time, is bias-controlled by a driver circuit 603. When the terminal voltage is monitored, the driver circuit 603 sets the optical amplifier to a reverse bias state, and the same operation as that of an ordinary optical detector is carried out. On the other hand, when the semiconductor optical amplifier is turned ON from the signal received, it is possible to set the optical amplifier 601 to a forward bias for carrying out the switching operation.

In this embodiment, too, various modifications are available. Here, for switching the optical semiconductor gate, the bias voltages are varied so as to monitor the terminal voltages. However, it is possible to carry out the monitoring under a non-bias state without the bias control.

As methods for communication, the operations of the device shown in FIG. 2 include the following:

(1) After the transmitting side transmits the address of the receiving side through the first optical fiber network, the receiving side loops-back a state of congestion and, when it is confirmed that there is no congestion at the receiving side, the transmitting side starts the communication. When this communication procedure is used, the time during which the transmitting side can confirm the state of congestion at the receiving side is no longer than about the time that is required for the loop-back signal to propagate, and this ensures establishing of high speed connections among the transmitting and receiving nodes. Also, for example, when the receiving side is congested and continues looping-back the signal transmitted, the transmitting side continues sending the address data of the receiving side as long as the signal is returned therefrom and, in this way, the information that the state of congestion has been released can be made known from the receiving side to the transmitting side by the interception of the looping-back signal. Also, when a number of transmission requests are simultaneously addressed to one receiving node, the receiving side schedules the sequence in which to receive the signals, and sequentially intercepts the looping-back signals, whereby the signal reception schedule can be worked out in a simple manner.

(2) In the above communication method, depending on communication procedures adopted, there is a possibility wherein the transmitting side may, before confirming the state of congestion of the receiving side, be unable to stop transmitting the signal. Under such a state, the device requires a data buffer which stores the transmitted data. In the optical communication network device of this configuration, if the buffer is provided at the receiving side, the size thereof is required to be large. However, where this is provided at the transmitting side, the size thereof can be made advantageously small. Further, where a number of such a communication network device are combined to form a large scale communication network, it may be arranged so that, after the state of congestion is looped-back from the receiving side to the transmitting side, if the buffer at the transmitting side is fully occupied, this information is looped-back to the transmitting side of the previous optical network stage and, in this way, it is possible to combine a plurality of optical networks or to make such networks in multiple stages.

In the above method, when the state of congestion at the receiving side is detected through the loop-back signal, the generation of the communication signal is stopped and, by applying a back-pressure, the data intended to be sent from the transmitting side is completely transmitted to the receiving side without loss of any data.

(3) In the procedure of transmitting the address signal from the transmitting side to the receiving side in the method explained above, it is arranged in advance that the data signal cycle of the transmittal signal be overlapped with the address signal. With this arrangement, simultaneously with the switching means being connected with the transmitting and receiving means, the communication can be started without the need of the operating time for establishing the synchronization among the transmitters and receivers.

In the method explained above, by transmitting the signal that is set to the same data transmission rate as the address signal and is distinguishable on a bite to bite basis, it is made possible for the synchronization of the receiving side to be established simultaneously with the transmission of the address signal, so that the simultaneous connections can be established without requiring ensemble signal transmission as needed in a conventional method.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method for communicating using a network having a plurality of nodes, a first network medium connected to a first group of said plurality of nodes and a second network medium for transmitting control signals and connected to a second group of said plurality of nodes, the first and second groups of said plurality of nodes being coupled together by a loop-back network, said method comprising the steps of:

transmitting a transmission signal from a transmitting node comprising any of said first group of said plurality of nodes to said first network medium when initiating data transmission, said step of transmitting a transmission signal to the first network medium comprising transmitting to a receiving node comprising any of said first group of said plurality of nodes;

looping-back to said second network medium said transmission signal from said receiving node that has received said transmission signal with said loop-back network and providing information on a state of congestion at said receiving node to said transmitting node with said second network medium.

2. An optical communication network device having a plurality of nodes, the nodes comprising a plurality of transmitting nodes and a plurality of receiving nodes, a first optical fiber network connecting said plurality of transmitting nodes and plurality of receiving nodes, and a second optical fiber network for transmitting control signals and connecting said plurality of transmitting nodes and plurality of receiving nodes, each of said plurality of transmitting nodes comprising:

an optical transmitter, a transmitter side optical control signal receiver and a transmitter side controller for controlling the optical transmitter using optical signals received by the transmitter side optical control signal receiver, said optical transmitter, transmitter side optical control signal receiver and transmitter side controller being coupled to said first optical fiber network, said transmitter side control signal receiver further being coupled to said second optical fiber network;

each of said plurality of receiving nodes comprising:

a receiving side optical data receiver, a receiving side optical control signal receiver, a receiving side controller, and a switch, said switch recognizing address data addressed to a receiving node from a signal received at said receiving side control signal receiver and performing switching between:

(1) looping-back of the signal received by said first optical fiber network as received to said second optical fiber network, and (2) introducing of said signal received into said receiving side optical data receiver.

3. An optical communication network device according to claim 2, comprising a wavelength multiplex type device and wherein outputs of said optical transmitters provided respectively to the nodes have wavelengths different from one another.

4. An optical communication network device according to claim 2, wherein said switches comprise optical semiconductor gate switches.

5. An optical communication network device according to claim 2, wherein said transmitting side control signal receivers provided respectively to the nodes comprise filters for selectively receiving only a signal transmitted from the optical transmitter of a transmitting node.

6. An optical communication network device according to claim 4, wherein each of said optical semiconductor gate switches are arranged such that they function also as said receiving side control signal receivers.

7. A method for communication using an optical communication network device of a wavelength multiplex type and in which outputs of optical transmitters provided respectively to nodes of an optical fiber network have wavelengths different from one another, said method comprising the steps of:

transmitting address data of a receiving node from a transmitting node with an optical transmitter to a first optical fiber network;

receiving with a receiving side control signal receiver the address data which is received from the first optical fiber network and which is transmitted from the transmitting node; and looping-back with a loop back network to a second network information on a state of congestion of the optical receiver of the receiving node.

8. A method for communication using an optical communication network device of a wavelength multiplex type and in which outputs of optical transmitters are provided respectively to nodes of an optical fiber network having wavelengths different from one another, said method comprising the steps of:

transmitting address data of a receiving node from a transmitting node with an optical transmitter to a first optical fiber network;

receiving with a receiving side control signal receiver the address data which is received from the first optical fiber network and which is transmitted from the transmitting node; and looping-back with a loop back network to a second network information on a state of congestion of the optical receiver of the receiving node; and further wherein, in the step of looping-back, a loop back signal from the receiving node is detected, and a request is made to the transmitting node to stop transmission, and if not possible to stop the transmission, the transmitted data is stored in a data buffer.

9. A method for communication according to claim 7, in which a pattern of said address data includes a synchronization signal.

* * * * *